United States Patent
Remmel

(10) Patent No.: US 6,209,750 B1
(45) Date of Patent: *Apr. 3, 2001

(54) ROLLED EDGE COVER FOR A COOKING VESSEL

(75) Inventor: Wayne R. Remmel, Kewaskum, WI (US)

(73) Assignee: Regal Ware, Inc., Kewaskum, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,930

(22) Filed: Aug. 24, 1998

Related U.S. Application Data

(60) Provisional application No. 60/057,871, filed on Sep. 2, 1997.

(51) Int. Cl.[7] .............................. A47J 36/06; B65D 43/00
(52) U.S. Cl. ..................... 220/796; 220/573.1; 220/912
(58) Field of Search ............................... 220/796, 573.1, 220/912, 801, 678, 641

(56) References Cited

U.S. PATENT DOCUMENTS

| | | | |
|---|---|---|---|
| 850,143 | * | 4/1907 | Donnelly ........................... 220/573.1 |
| 1,618,675 | * | 2/1927 | Quigley ............................. 220/573.1 |
| 1,701,384 | | 2/1929 | McGarvey . |
| 1,799,205 | * | 4/1931 | Wood ................................... 220/641 |
| 2,688,419 | * | 9/1954 | Henchert ............................. 220/678 |
| 2,719,645 | | 10/1955 | Wyman . |
| 2,934,236 | * | 4/1960 | Groves ................................ 220/678 |
| 4,258,695 | * | 3/1981 | McCarton et al. ............ 220/573.1 X |

FOREIGN PATENT DOCUMENTS

| | | | |
|---|---|---|---|
| 188749 | * | 4/1937 | (CH) ................................... 220/641 |
| 4-28423 | | 1/1992 | (JP) . |
| 4-33725 | | 2/1992 | (JP) . |

* cited by examiner

*Primary Examiner*—Allan Shoap
*Assistant Examiner*—Joe Merek
(74) *Attorney, Agent, or Firm*—Ryan Kromholz & Manion, S.C.

(57) ABSTRACT

A cover for a cooking vessel with a strengthened edge comprises a central portion having a downwardly depending skirt with an upper portion substantially the same outer diameter as the cooking vessel, a diametrically inwardly offset lower portion having a doubled wall thickness and a substantially horizontal offset portion formed between the upper and lower portions of the skirt. A method of forming a strengthened edge on a cover for a cooking vessel includes flattening an inwardly rolled bead formed on a cut edge of a downwardly depending skirt of a cover blank, the flattening process forming a diametrically inward offset in the lower portion of the downwardly depending skirt and mechanically sealing the cut edge of the skirt to the lower portion of the skirt.

2 Claims, 2 Drawing Sheets

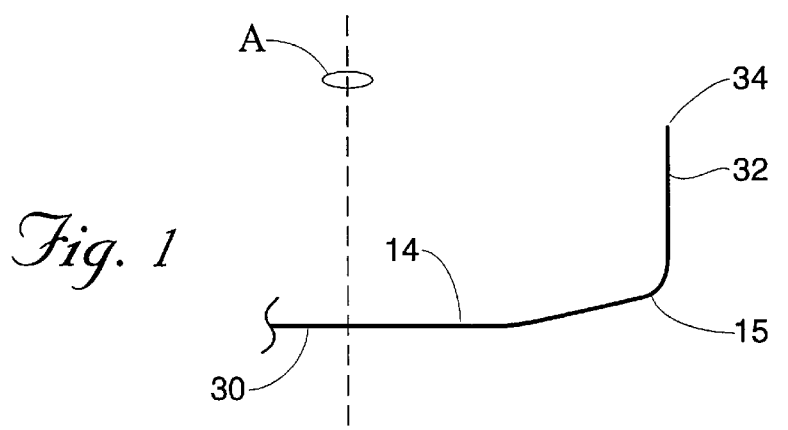
Fig. 1
Fig. 2
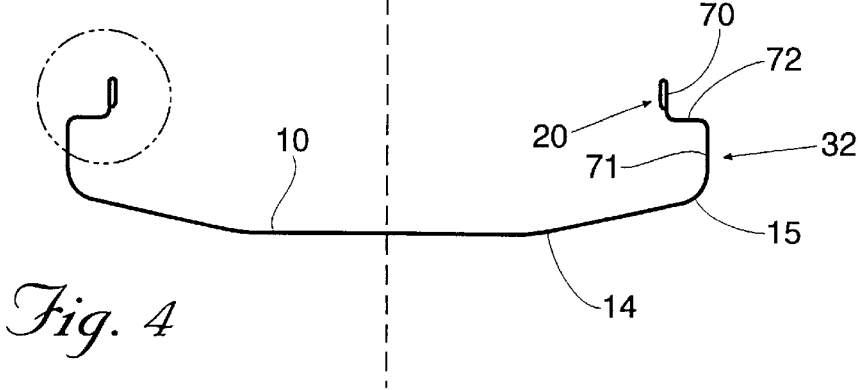
Fig. 3
Fig. 4

ROLLED EDGE COVER FOR A COOKING VESSEL

Priority and benefit of earlier filing date of provisional application Serial No. 60/057,871, filed Sep. 2, 1997, is claimed.

BACKGROUND OF THE INVENTION

This invention relates to removable covers for cooking vessels and specifically to a strengthened and improved downwardly depending edge for said covers.

In the art of designing cooking vessels, it is desirable to design a cover or lid for a cooking vessel that is both strong and light weight. Accordingly, covers for cooking vessels are generally formed of relatively thin material that has a high strength and rigidity. Examples of such materials are stainless steel and aluminum. It is also well known in the art that forming complex shapes or curves into the cover of a cooking vessel will make the cover stronger and more rigid. These complex shapes or curves may also make the cover for a cooking vessel more aesthetically pleasing.

One drawback to the use of relatively thin materials in a cover for cooking vessels is that a downwardly depending edge of the cover may become dented or otherwise deformed. These deformations occur as the result of normal use and as the result of accidents, such as dropping the cover on the floor. However, the maintenance of the shape of a downwardly depending edge of a cover is critical to the proper mating of the cover with a corresponding cooking vessel. If the edge becomes deformed the performance of the cooking vessel is reduced. One objective of the design of the present invention is to provide a strengthened edge for the cover of a cooking vessel. Another object of this invention is to provide a cover for a cooking vessel that is both strong and not susceptible to the build-up of volatile food substances. Another object of this invention is to provide an improved method for fabricating such a cover for a cooking vessel.

SUMMARY OF THE INVENTION

The present invention may generally be described as a cover for a cooking vessel having a strengthened edge for improved life of the cover and which further provides a positioning means for positively positioning the cover on the corresponding cooking vessel. The strengthened edge for the cover of the cooking vessel comprises a downwardly extending on depending skirt. An upper portion of the downwardly depending skirt has substantially the same outer diameter as that of corresponding cooking vessel. The skirt also has an inwardly offset lower portion, this lower portion having an outer diameter such that the lower portion may be received within the inner diameter of a rim of a corresponding cooking vessel. The lower portion of the skirt is folded inwardly and upwardly upon itself Furthermore, the folds of the lower portion are mechanically sealed so as to remove any spaces between the inner and outer layer of the lower portion, thereby preventing the ingress of volatile food substances into the interface between the inner and outer layers of the folds.

Between the upper portion of the cover and the inwardly offset lower portion of the skirt is a substantially horizontal offset portion that, when the lower portion of the skirt is received by the corresponding cooking vessel, supports the cover on the upper edge of a corresponding cooking vessel.

In addition, the lower portion of the skirt of the cover for a cooking vessel may be frusto-conical in shape.

The method for forming the strengthened edge on a cover for a cooking vessel comprises forming a cover blank having a central portion of appropriate diameter and shape, and a downwardly depending skirt of substantially cylindrical shape that terminates in a cut edge. Forming an inwardly rolled bead on the cut edge of the skirt. Forming an offset intermediate an upper and a lower portion of the skirt, effectively flattening the inwardly rolled bead such that the lower portion of the skirt is comprised of an inner layer mechanically sealed to an outer layer that defines the outer diameter of the lower portion of the skirt.

DESCRIPTION OF THE DRAWINGS

FIG. 1 shows an inverted partial cross section of a cover blank.

FIG. 2 shows an inverted partial cross section of a cover blank and depicts generally how a beading die forms an inwardly rolled bead on the cut edge of a cover blank.

FIG. 3 shows an inverted partial cross section of a cover blank and depicts how a pair of complimentary mating offset dies engage the lower portion of the downwardly depending skirt to form an offset.

FIG. 4 shows an inverted cross section of a cover having a strengthened edge.

DETAILED DESCRIPTION

Figure 5:
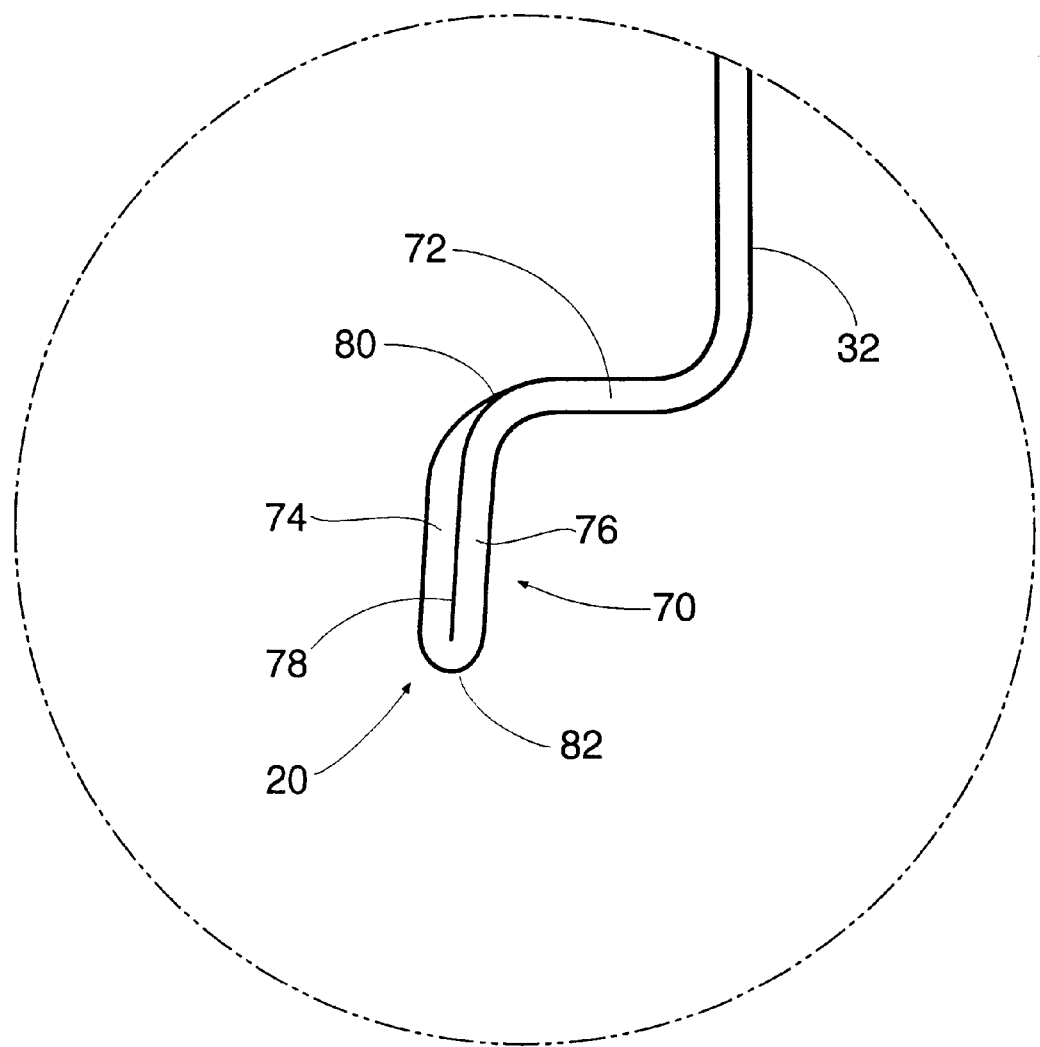
FIG. 5 shows a fragmentary enlarged view of the dotted circular area to the left of FIG. 4.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

It will be apparent that the configuration of the cooking vessel cover is not necessarily limited to a circular configuration. The term "diameter" has been used merely to simplify the explanation of the cooperating parts.

Referring to FIG. 4, a cover 10 for a cooking vessel having a strengthened edge comprises a central portion 14 of appropriate diameter and shape having formed to its outer edge 15 a downwardly depending skirt 32. The downwardly depending skirt 32 has its lower portion 70 diametrically inwardly offset. The outer diameter of the inwardly offset lower portion 70 being sized so as to be received into the inner diameter of a corresponding cooking vessel 22 (not shown). The outer diameter of the upper portion 71 of the downwardly depending skirt 32 is substantially the same as the outer diameter of a corresponding cooking vessel 22. Formed intermediate to the upper portion 71 and the lower portion 70 is an offset portion 72. The offset portion 72 of the downwardly depending skirt 32 is substantially horizontal and, when the lower portion 70 is received by a corresponding cooking vessel 22, the cover 10 will be supported upon the upper edge of cooking vessel 22 by the offset portion 72 of the cover 10.

Referring to FIG. 5, the material forming the lower portion 70 of the downwardly depending skirt 32 is folded inwardly and upwardly upon itself to form an inner layer 74 and an outer layer 76. The material forming the lower portion 70 is folded in such a manner that the inner layer 74 and the outer layer 76 are substantially in contact which each other along substantially all of their height along an interface 78. Furthermore, the cut edge 34 (FIG. 1) terminating the inner layer 74 is mechanically sealed at juncture 80 to the outer layer 76. The mechanical seal between the inner layer and outer layer 74 and 76 respectively, is such that no volatile food substance may enter the interface 78 between the layers. The folded configuration doubles the thickness of the lower portion. The strengthened edge 20 presents at its lowest point a radiused edge 82.

The lower portion 70 of the downwardly depending skirt 32 may be substantially cylindrical in shape, however it is preferable that the lower portion 70 be of a frusto-conical shape. The actual shape of the lower portion 70 of the downwardly depending skirt 32 is defined and formed by a pair of complimentary mating offset dies 84 which are used to form the offset into the lower portion of the downwardly depending skirt 32.

A method of making a cover for a cooking vessel having a strengthened edge is depicted in FIGS. 1 through 3. In the first step of this method, a steel sheet is formed into a cover blank 30 by a punch press. (See FIG. 1). Next, the cover blank 30 is secured in a conventional rolling mill having a beading die 52 of predetermined radius. As the cover blank 30 is rotated about its axis of symmetry A within the conventional rolling mill the freely rotating beading die or dies 52 are forced longitudinally into the cut edge 34 of the downwardly depending skirt 32 thereby forming an inwardly rolled bead 50. (See FIG. 2). In the third step, (FIG. 3) the cover blank 30 now having an inwardly rolled bead 50 formed into the lower portion 70 of the downwardly depending skirt 32 is secured within a second rolling mill having a complimentary set of offset dies. The inner element 86 of the offset die defines the shape of the inner diameter of the downwardly depending skirt 32 while the outer element 88 of the offset die defines the outer diameter of the downwardly depending skirt 32. As the cover blank 30 is rotated about its central axis within the conventional rolling mill the freely rotating inner die 86 is secured into position in contact with the inner diameter of the downwardly depending skirt 32. The outer die 88, also freely rotatable, is then brought into contact with the outer diameter of the downwardly depending skirt 32 in such a way that the inwardly rolled bead 50 is forced against the inner die 86. The pressure exerted on the downwardly depending skirt 32 by the outer die 88 forms the offset 72 (see FIGS. 4 and 5) and compresses the lower portion 70 of the downwardly depending skirt 32 into its folded final configuration. The pressure exerted by outer die 88 also mechanically seals the cut edge 34 of the downwardly depending skirt 32 at juncture 80.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A cover for a food cooking vessel, said cooking vessel having an upper edge and an inner and an outer diameter; said cover including a central portion of predetermined size and shape, and an outer edge;

a downwardly depending skirt extending from said outer edge, said skirt having an upper portion of substantially the same outer diameter as the corresponding cooking vessel and a diametrically inwardly offset lower portion having an outer diameter sized so as to be received by the inner diameter of the cooking vessel;

the lowermost portion of the skirt being inwardly folded upon itself to provide substantially equal-length inner and outer adjacent portions, said adjacent portions, being in substantial contact with one another along substantially all of their height to provide an uninterrupted interface, and wherein the inner half portion is tapered at its distal end towards and extending over a part of the outer portion, said taper and said substantial contact of said half-portions cooperating to prevent the entrance of food particles within said interface.

2. The cover of claim 1 including a substantially horizontal offset portion located between said upper and said lower portions of said skirt for supporting the cover on the upper edge of the cooking vessel.

* * * * *